United States Patent [19]

Bergstrom

[11] Patent Number: 4,864,724
[45] Date of Patent: Sep. 12, 1989

[54] PLANAR MOUNTING OF SILICON MICROMACHINED SENSORS FOR PRESSURE AND FLUID-FLOW MEASUREMENT

[75] Inventor: John S. Bergstrom, Williamsburg, Va.

[73] Assignee: Siemens-Bendix Automotive Electronics L.P., Troy, Mich.

[21] Appl. No.: 195,733

[22] Filed: May 16, 1988

[51] Int. Cl.[4] ........................ H01R 43/00; G11B 5/42
[52] U.S. Cl. ........................................... 29/854; 29/620
[58] Field of Search ................................. 29/854, 620

[56] References Cited

U.S. PATENT DOCUMENTS 4,624,138 11/1986 Ono et al. ............................ 29/620
4,691,418 9/1987 Ingle et al. .......................... 29/854

Primary Examiner—Timothy V. Eley
Attorney, Agent, or Firm—Russel C. Wells

[57] ABSTRACT

A process for flush-mounting a silicon micromachined sensor for fluid flow measurements with an adjacent face of a substrate. The faces of the substrate and sensor, over which the fluid flow will pass, are disposed face down on a conformal surface. Adhesive is applied between the sensor and substrate to secure the sensor and substrate one to the other. Upon removal from the conformal surface, the faces are cleaned of adhesive and the electrical signal generating means of the sensor are connected with the signal processing means, for example, by wire bonding. In this manner, the sensor lies flush with the face of the substrate, avoiding interference with the fluid flow over the sensor face and, hence, maintaining sensitivity throughout the life of the sensor.

10 Claims, 2 Drawing Sheets

PLANAR MOUNTING OF SILICON MICROMACHINED SENSORS FOR PRESSURE AND FLUID-FLOW MEASUREMENT

FIELD OF THE INVENTION

The present invention relates generally to pressure and fluid-flow sensors and particularly to silicon micromachined sensors for determining characteristics of fluid flow, e.g., for sensing mass fluid flow of an airstream.

BACKGROUND OF THE INVENTION

With the advent of silicon michromachining processes for forming silicon micromachined sensors, improved sensor performance, reductions in cost and improved sensitivity to non-electrical input parameters for conversion into electrical signals have been achieved. Generally, silicon micromachining enables precision formation of three-dimensional shapes in silicon and includes various process steps employing photolithography, etching and thin-film deposition. Silicon micromachined sensors have been used and have the capability for use in many environments. For example, electronic fuel management systems in automobiles have to be able to rely on sensors, for example, in the fuel air stream, which are rugged and reliable and which have fast response times. More generally, fluid flow sensors employing silicon micromachining techniques have been developed to measure parameters such as pressure, acceleration, vibration, radiation and the like. Where these sensors have been employed in fluid flow environments, however, the sensors are normally mounted on a substrate in overlying relation where they project from the substrate surface. Additionally, the electrical connections between the fluid flow sensitive electrical signal producing elements of the sensor and the electrical interconnects for the signal processing means stand out or project from the substrate. These types of sensor and electrical connection mountings interfere with the flow of the fluid over the substrate. Consequently, the measured fluid flow parameters may not accurately reflect the actual fluid flow and may require correction for such interference. For example, where a mass airflow sensor is mounted on an airfoil in a fluid flow stream in a confined tube or chamber, the projecting sensor would create a turbulence about the area of the sensor which is required to measure the static pressure of the flow past the sensor. Consequently, the measured static pressure would be different than the actual static pressure of the fluid in the same region in the absence of a projecting sensor. Also, by projecting from the substrate surface, particles within the flow may impact and adhere to the sensor and its electrical interconnections to the extent of interfering with its sensing function or at least inhibiting the sensitivity of the sensor.

Prior mass fluid-flow sensors employing silicon micromachining techniques have been mounted to project from the substrate with an overlying hood structure used to channel the fluid over the sensing elements of the sensor. The hood structure has, to some extent, eliminated the problems associated with the non-covered projecting sensor but has not eliminated them in their entirety. As a result, there has developed a need for silicon micromachined fluid flow sensors which do not interfere with, or minimize their interference with, the fluid flow passing over the sensing area and which inhibits or directly eliminates the impact and adherence of particles in the fluid flow on the sensor per se such that its sensitivity to the parameters being measured remains substantially constant.

SUMMARY OF THE INVENTION

In accordance with the present invention, there is provided a silicon micromachined fluid flow sensor which is mounted in substantially flush relation with the surrounding substrate such that the sensor and its electrical interconnections, i.e., wire bonds, between the sensor's electrical signal generating elements and the electrical processing means do not project substantially from the surface of the substrate whereby interference by the sensor and its electrical connections with the fluid flow as well as decrease in sensitivity thereof due to particle impact and adherence are substantially reduced or eliminated. To accomplish this, the present invention provides a method of mounting the silicon micromachined sensor to the substrate, enabling the faces of the substrate and silicon micromachined sensor to lie substantially flush or planar one to the other in the fluid flow. This is achieved in one embodiment of the present invention by first providing a surface conformal to the surfaces of the substrate and the sensor. While this surface will normally constitute a flat surface, the substrate and sensor may, for certain applications, comprise a curved surface. Consequently a surface conformal to the faces of the substrate and sensor, whether they be flat or curved, is provided. The substrate is located to overlie the surface with the face of the substrate over which the fluid will flow lying in conformal opposition to the surface. A cavity is provided in the substrate for receiving the sensor. The sensor is then located in the cavity with its face abutting the conformal surface, the sensor being spaced from the margins of the substrate defining the cavity. In this manner, an adhesive may be applied from the backside of the substrate and sensor into the cavity spaces between the sensor and substrate to secure the sensor and substrate one to the other. After the combined sensor and substrate are removed from the conformal surface, and the flush surfaces of the sensor and substrate are cleaned, for example, by a plasma cleaning technique, wire bonds are then connected between the interconnects of the sensor and the leads of the substrate connecting with the electronic processing means remote from the sensor.

In the above-described process, the adhesive is preferably a polyimide or an alumina-filled epoxy. Also, various techniques may be used to connect the electrical interconnects of the sensor with the leads along the substrate, for example, tape-automated bonding or low-profile wire bonds, or beam-lead techniques.

Where the fluid flow silicon micromachined sensor is used in a fluid flow channel, the wall of the channel may constitute the substrate in which the sensor is mounted. Alternatively, the channel may be provided with an airfoil constituting the substrate. Thus, when the airfoil is inserted into the fluid flow channel, the sensor would be in position to measure, for example, the static pressure of the flow. The pressure may be sensed by metal strain gauges, piezoresistors and silicon diaphragms. Silicon diaphragm sensors are preferred and pressure changes across the diaphragm are sensed by a bridge network on the diaphragm which generates an electrical signal.

In one preferred embodiment of the present invention, mass airflow may be determined. Because mass airflow is a function of the area of the channel, the velocity of fluid flow and the density of the fluid at a measured temperature, by measuring the stagnation and static pressures of the airstream and its temperature, mass airflow can be ascertained. In this form, the flush surface of the sensor exposed to the airstream measures the static fluid pressure across the surface. The opposite side of the diaphragm is exposed to the airflow in a manner which deflects the diaphragm as a function of the stagnation pressure. Velocity may then be determined as a function of the diaphragm deflection responsive to the static and stagnation pressures on opposite sides of the diaphragm.

A temperature-measuring resistor is also provided on the diaphragm. Changes in the resistance are thus a function of the temperature change and the electrical signals therefrom may be processed with the pressure measurement signals to determine mass airflow.

In a preferred embodiment of the present invention, there is provided a method for mounting a silicon micromachined fluid flow pressure sensor in a substrate having a performed cavity for receiving the sensor in such manner that a sensing face of the sensor lies substantially flush with a corresponding face of the substrate to minimize or eliminate sensor and sensor interconnect interference with fluid flow over the substantially flush mounted substrate and sensor faces, the sensor carrying pressure sensitive electrical signal producing elements responsive to changes in fluid flow over the sensor and electrical interconnects for connecting the elements with electrical signal processing means, comprising the steps of providing a surface conformal to the surfaces of the substrate and the sensor, locating the substrate on the conformal surface with the substrate face in opposition to the surface, locating the sensor on the conformal surface with the sensor face in opposition to the surface and with margins of the sensor spaced from the margins of the substrate defining the cavity, applying adhesive material into the spaces between the substrate and the sensor from the sides of the substrate and the sensor opposite their faces to secure the substrate and the sensor one to the other, removing the substrate and the sensor from the conformal surface, cleaning the adjoining surfaces of the sensor and substrate to remove any adhesive migrating onto the surfaces and connecting the electrical interconnects with electrical signal processing means external of the sensor.

Accordingly, it is a primary object of the present invention to provide a novel and improved method for mounting a silicon micromachined fluid flow measuring sensor which substantially eliminates or minimizes any interference with fluid flow passing over the sensor and avoids impact and adherence of any particles in the fluid flow on the sensor, hence maintaining the sensitivity of the sensor.

These and further objects and advantages of the present invention will become more apparent upon reference to the following specification, appended claims and drawings.

DETAILED DESCRIPTION OF THE PREFERRED EXEMPLARY EMBODIMENT

Reference will now be made in detail to the present preferred embodiment of the invention, an example of which is illustrated in the accompanying drawings.

As used in the present specification, the term "fluid" has reference to and encompasses the flow of any gas in a fluid stream, for example, an air stream or a fuel/air stream for supplying a fuel/air mixture to the engine in an automotive environment.

Figure 1:
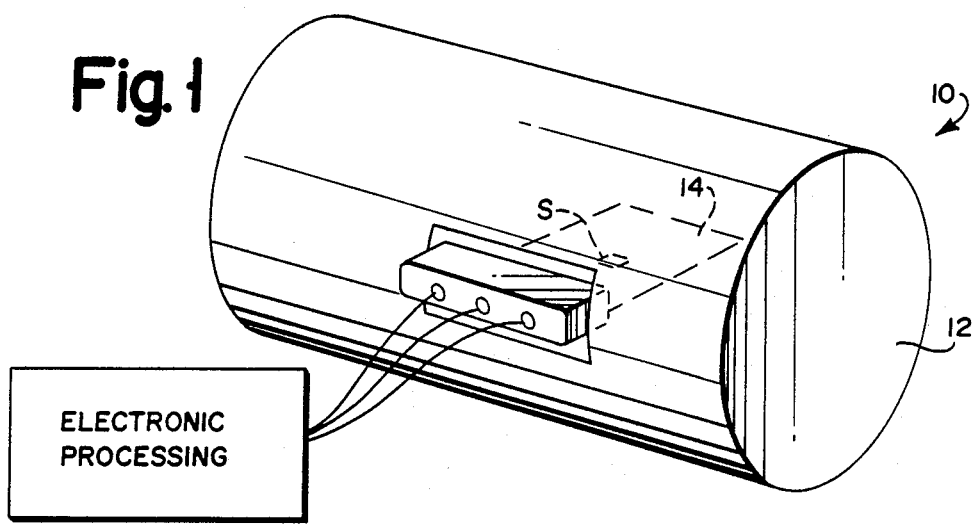
FIG. 1 is a perspective view illustrating an airfoil mounted in a fluid flow channel, the airfoil having a silicon micromachined fluid sensor mounted in its surface in accordance with the present invention.

Referring to FIG. 1, there is illustrated a fluid flow channel, generally designated 10, comprising a housing 12, in this case a tubular channel, in which is mounted an airfoil 14. The airfoil spans the housing 12 substantially at a diametrical position, although it will be appreciated that the airfoil may be mounted in other locations in the channel 12. A sensor S is mounted on the airfoil, although it may be mounted in the wall of the channel per se, eliminating the airfoil entirely. In accordance with the present invention, as illustrated in FIG. 1, the sensor S is substantially flush mounted on one of the surfaces of airfoil 14 and electrical connectors 15 are schematically illustrated leading from sensors to the electrical signal processing means, not shown, external to housing 12 for processing signals from the sensor.

Figure 2:
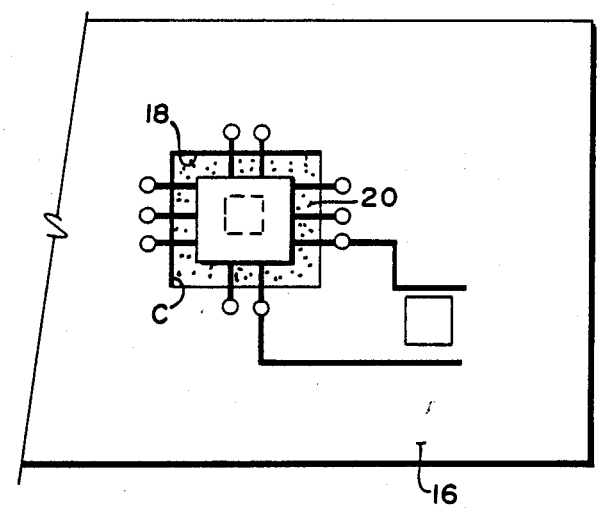
FIG. 2 is a fragmentary enlarged top plan view of a sensor for use on the airfoil of FIG. 1.

In FIG. 2 there is illustrated a silicon micromachined sensor mounted in a substrate 16. The substrate 16 has a cavity C defined by the edges 18 of an opening through or into the substrate 16. Any type of silicon micromachined sensor for sensing a parameter of fluid flow, for example, pressure, may be used in accordance with the present invention, depending upon the characteristics of the fluid flow desired to be measured. In the present invention, a silicon sensor for measuring pressure and temperature whereby mass airflow can be ascertained is employed. Also illustrated in FIG. 2 are the electrical interconnections 20 constituting wire bonds between the electrical signal generating elements of sensor S and leads, not shown, in the substrate for connection with electrical signal processing means, also not shown. The substrate may be provided in any shape and may be formed of alumina, silicon or a coated ceramic metal core.

Figure 3:
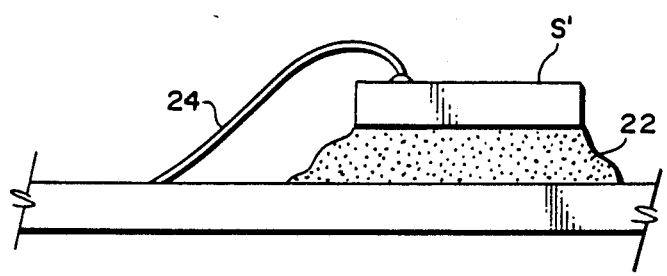
FIG. 3 is an enlarged side elevational view of a substrate illustrating a typical prior art fluid flow sensor mounted on the surface of the substrate and projecting therefrom and also illustrating the electrical connecting bonds between the sensor and electrical signal processing means, not shown.

Referring now to FIG. 3, which is an illustration of a prior art method of mounting the sensor on the substrate, it will be seen that sensor S' is mounted on the top of the substrate in the air flow. Such mountings are usually accomplished simply by adhesively bonding the sensor S' to the outer surface of the substrate. Such adhesive bonding is illustrated at 22. Additionally, the wire bonding between the electrical signal generating elements of the sensor and the signal processing means is illustrated at 24 extending from the upper surface of the sensor to the substrate. As can be appreciated from a review of this Figure, sensor S' and its leads project into the fluid flow stream, causing interference with the flow stream sensed by sensor S'. Additionally, particles, if any, in the airstream impact on the sensor's sensing elements, all of which decreases the sensitivity of the sensor and requires correction in the electronic signal processing to compensate for such interference.

Figure 4:
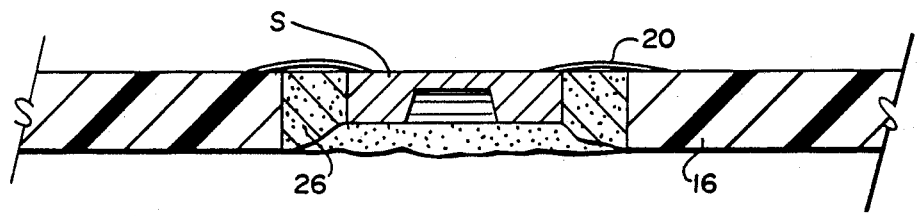
FIG. 4 is an enlarged view of the substrate with the silicon micromachined sensor mounted in the substrate in accordance with the present invention.

In contrast, there is illustrated in FIG. 4 a sensor S mounted in accordance with the present invention wherein the surface of the sensor exposed to the fluid stream lies substantially flush with the adjoining surfaces of the substrate. Likewise, the wire bonds 20 between the electrical signal generating elements of the sensor and the leads to the electrical processing means also lie substantially flush with the adjoining faces of the sensor and substrate. Consequently, the face of the sensor which senses the fluid flow parameters does not protrude into the fluid flow stream and hence does not cause interference therewith. Also, it is mounted in a position such that particles in the fluid stream do not impact on the sensor's sensing face and hence do not adhere thereto.

Figure 5:
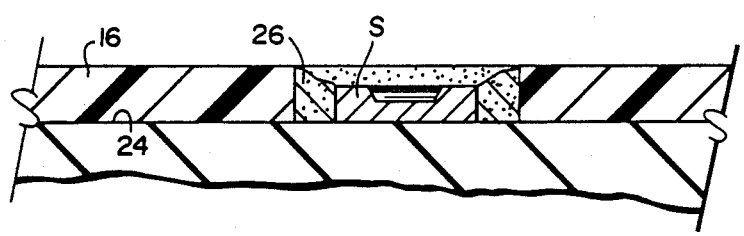
FIG. 5 is a cross-sectional view illustrating the mounting of the sensor in the substrate in accordance with the present invention.

To accomplish this, and with reference to FIG. 5, the faces of the substrate and sensor which will be exposed to the fluid flow stream are placed downwardly in opposition on a conformal surface 24. Normally, the conformal surface 24 will be flat, provided the adjoining faces of the substrate and sensor are flat. If the sensor is to be mounted in an airfoil shape, the conformal surface may be complementarily curved as the adjoining faces of the substrate and sensor are curved to form the curved surface of the airfoil. Preferably, a release material is provided on the conformal surface before the substrate and sensor are applied thereto.

With the sensor applied in the cavity, it will be appreciated that spaces are provided between the margins of the substrate defining the cavity and the edges of the sensor. An adhesive 26 from the backside of the substrate is then applied into such spaces. The adhesive is preferably a polyimide and may be an alumina-filled epoxy. The adhesive is allowed to cure and the substrate and sensor secured thereto are then removed from the conformal surface 24. The adjoining faces of the substrate and sensor, previously in contact with the flat surface, are then cleaned, preferably by a conventional plasma cleaning process, to remove any adhesive which has migrated from the spaces between the sensor and the edges of the substrate onto the faces of the sensor and substrate.

Once the faces are clean, the electrical signal generating elements of the sensor are connected to the electrical signal processing means, not shown, preferably by wire bonding, tape automated bonding or beam lead techniques. The bonding is illustrated in FIG. 2 at 20. It will be appreciated that the bonding, while it overlies the adhesive 26 spanning the cavity between the sensor and the substrate, does not project substantially above the flush surfaces of the sensor and substrate. By using low-profile bonding, therefore, the electrical connections do not interfere or only minimally interfere with the airflow passing over the sensor.

Figure 6:
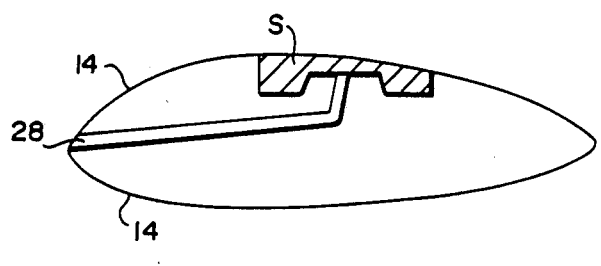
FIG. 6 is a cross-sectional view of the airfoil illustrated in FIG. 1 showing the sensor positioned for measurement of mass airflow.

When using the sensor for measuring mass flow, stagnation and static pressures may be measured as applied to opposite sides of the diaphragm of the sensor. Thus, the airfoil 14 may be provided with a passageway 28 leading from the nose of the airfoil to the inside surface of the diaphragm of the sensor. The static pressure, of course, is measured along the outside surface of the diaphragm. This arrangement is illustrated in FIG. 6. Additionally, a temperature measuring resistor is provided on the diaphragm. The change in resistance is a function of the temperature change and electrical signals generated thereby are processed together with the electrical signals indicative of the static and stagnation pressures to determine mass airflow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for mounting a silicon micromachined fluid flow pressure sensor in a substrate having a performed cavity for receiving the sensor in such manner that a sensing face of said sensor lies substantially flush with a corresponding face of the substrate to minimize or eliminate sensor and sensor interconnect interference with fluid flow over the substantially flush mounted substrate and sensor faces, the sensor carrying pressure sensitive electrical signal producing elements responsive to changes in fluid flow over said sensor and electrical interconnects for connecting said elements with electrical signal processing means, comprising the steps of:

providing a surface conformal to the surfaces of the substrate and the sensor;

locating the substrate on the conformal surface with said substrate face in opposition to said surface;

locating said sensor on said conformal surface with said sensor face in opposition to said surface and with margins of said sensor spaced from the margins of said substrate defining said cavity;

applying adhesive material into the spaces between said substrate and said sensor from the sides of said substrate and said sensor opposite their faces to secure said substrate and said sensor one to the other;

removing the substrate and the sensor from the conformal surface;

cleaning the adjoining surfaces of the sensor and substrate to remove any adhesive migrating onto the surfaces; and connecting said electrical interconnects with electrical signal processing means external of said sensor.

2. A method according to claim 1 including the step of applying a polyimide into the spaces between said substrate and said sensor.

3. A method according to claim 1 including the step of applying an alumina filled epoxy into the spaces between said substrate and said sensor.

4. A method according to claim 1 including using low profile wire bonds to connect said electrical interconnects and said electrical signal processing means spanning the spaces between said sensor and said substrate on the same side thereof as said faces.

5. A method according to claim 1 including the step of providing a substrate formed of alumina.

6. A method according to claim 1 including the step of providing a substrate formed of silicon.

7. A method according to claim 1 including the step of providing a substrate formed of a coated ceramic metal core.

8. A method according to claim 1 wherein said sensor in said cavity is spaced from the margins of said cavity and wherein said mounting means includes an adhesive material in the space between said substrate and said sensor and in said cavity to secure said substrate and said sensor one to the other.

9. A mounting according to claim 8 wherein said adhesive comprises a polyimide.

10. A mounting according to claim 8 wherein said adhesive comprises an alumina filled epoxy.

* * * * *